United States Patent
Huang

(10) Patent No.: US 8,023,944 B2
(45) Date of Patent: Sep. 20, 2011

(54) APPARATUS AND METHOD FOR PERFORMING ATTACH PROCEDURE IN MOBILE COMMUNICATION SYSTEM

(75) Inventor: Jen-Sheng Huang, San Diego, CA (US)

(73) Assignee: Via Telecom, Inc., San Diego, CA (US)

( * ) Notice: Subject to any disclaimer, the term of this patent is extended or adjusted under 35 U.S.C. 154(b) by 406 days.

(21) Appl. No.: 12/417,762

(22) Filed: Apr. 3, 2009

(65) Prior Publication Data
US 2010/0081435 A1    Apr. 1, 2010

Related U.S. Application Data

(60) Provisional application No. 61/101,145, filed on Sep. 29, 2008.

(51) Int. Cl.
*H04W 4/00*    (2009.01)

(52) U.S. Cl. ............... 455/435.1; 455/432.1; 455/435.2; 455/436

(58) Field of Classification Search ............... 455/432.1, 455/435.1, 435.2, 435.3, 436, 550.1, 551
See application file for complete search history.

(56) References Cited

U.S. PATENT DOCUMENTS

| | | | | |
|---|---|---|---|---|
| 6,493,552 | B1* | 12/2002 | Hicks | 455/435.2 |
| 7,197,312 | B2* | 3/2007 | Gunaratnam et al. | 455/445 |
| 7,313,371 | B2* | 12/2007 | Gibbs | 455/127.1 |
| 7,580,414 | B2* | 8/2009 | Yi | 370/395.52 |
| 2004/0147266 | A1* | 7/2004 | Hwang et al. | 455/445 |
| 2007/0165573 | A1* | 7/2007 | Hietalahti | 370/331 |
| 2008/0220782 | A1* | 9/2008 | Wang et al. | 455/436 |
| 2010/0222023 | A1* | 9/2010 | Aoyama et al. | 455/411 |

* cited by examiner

*Primary Examiner* — Nick Corsaro
*Assistant Examiner* — Michael S Bush
(74) *Attorney, Agent, or Firm* — Thomas|Kayden

(57) ABSTRACT

A service network for handling abnormal interrupts, including tracking area updates, lower layer failures, and guard timer expiries, during an attach procedure with a user equipment is provided. The service network includes a radio access network and a control node. When the radio access network detecting an abnormal interrupt, the control node aborts the attach procedure by sending a detach request message, via the radio access network, to the user equipment.

28 Claims, 8 Drawing Sheets

APPARATUS AND METHOD FOR PERFORMING ATTACH PROCEDURE IN MOBILE COMMUNICATION SYSTEM

CROSS REFERENCE TO RELATED APPLICATIONS

This Application claims priority of U.S. Provisional Application No. 61/101,145, filed Sep. 29, 2008.

BACKGROUND OF THE INVENTION

1. Field of the Invention

The invention generally relates to handling abnormal interrupts during an attach procedure, and more particularly, to a system, apparatuses, and methods for handling abnormal interrupts, including tracking area updates, lower layer failures, and guard timer expiries, during an attach procedure in a mobile communication system.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical mobile communication system, a mobile user equipment (UE) communicates with one or more service networks via radio access networks of the service networks. A UE comprises various types of equipment such as a mobile telephone (also known as cellular or cell phone), a laptop computer with wireless communications capability, a personal digital assistant (PDA) etc. UE may be portable, hand-held, pocket-sized, or installed in a vehicle etc. . . . and communicate voice and/or data signals with a radio access network.

A universal mobile telecommunications system (UMTS) is a third generation mobile communication system that has evolved from the Global System for Mobile communications (GSM) system. The UMTS is a European standard which aims to provide better mobile communication services based on the GSM core network and wideband code division multiple access (W-CDMA) technology. Although UMTS delivers high data transfer rates, wireless data usage is expected to increase significantly over the next few years. For this reason, concepts for UMTS Long Term Evolution (LTE) have been proposed, with the objective to further improve UMTS to achieve high-data-rates, low-latency and packet-optimized radio access technology. The improved UMTS technology is called Evolved Universal Terrestrial Radio Access (E-UTRA) and the system employing the E-UTRA technology is called an Evolved Packet System (EPS).

Consider a wireless mobile device, generally referred to as a UE, which complies with the 3GPP specifications for the E-UTRA protocol. The 3GPP TS 24.301 specification, v.1.0.0, referred to herein as the 24.301 specification, addresses the subject of the Non-Access-Stratum (NAS) protocol requirements for the EPS and the UE. The 3GPP TS 36.304 specification, v.8.3.0, is referred to herein as the 36.304 specification.

After the UE is powered on and connects to the EPS, it will need to perform an attach procedure to register itself to the EPS so that it can start a packet data session over the EPS. As illustrated in FIG. 1, the attach procedure starts by the UE sending an ATTACH REQUEST message to the EPS (step S101). The ATTACH REQUEST message may be sent combined with a PDN CONNECTIVITY REQUEST message indicating that the UE wishes to start a packet data session with the EPS. When the EPS receives the ATTACH REQUEST message, it authenticates the UE, checks if the UE is authorized to have access to packet data services, and performs a security mode control procedure to activate the encryption on the subsequent messages in the connection (step S102). If none of the checks fails, the EPS accepts the attach request by sending an ATTACH ACCEPT message to the UE. The ATTACH ACCEPT message may be sent combined with an ACTIVATE DEFAULT EPS BEARER CONTEXT REQUEST message if the PDN CONNECTIVITY REQUEST message is found in the ATTACH REQUEST message (step S103). The ACTIVATE DEFAULT EPS BEARER CONTEXT REQUEST message is used to activate the default bearer for the packet data session. When the UE receives the ATTACH ACCEPT message from the EPS, it corresponds to the EPS with an ATTACH COMPLETE message to acknowledge that it has received the ATTACH ACCEPT message (step S105). The ATTACH COMPLETE message may be sent combined with an ACTIVATE DEFAULT EPS BEARER CONTEXT ACCEPT message indicating that the UE has accepted the configuration of the default bearer from the ACTIVATE DEFAULT EPS BEARER CONTEXT REQUEST message. Lastly, the EPS waits for the ATTACH COMPLETE message combined with the ACTIVATE DEFAULT EPS BEARER CONTEXT ACCEPT message. If the ATTACH COMPLETE message is received, the attach procedure ends successfully. Otherwise, the EPS will resend the ATTACH ACCEPT message to the UE.

However, in accordance with clause 5.5.1.2.7 of the 24.301 specification, when some abnormal interrupts occur (step 104), for instance, lower layer failure, the guard timer T3450 of the attach procedure expiring for 5 times, the tracking area of the UE is changed, etc., before the ATTACH COMPLETE message is received, the EPS does not resend the ATTACH ACCEPT message. That is to say, the ESM sub-layer in the UE is in the BEARER CONTEXT ACTIVE state while the ESM sub-layer in the EPS remains in the BEARER CONTEXT ACTIVE PENDING state. Thus, as the attach procedure is initiated for a packet data session, failing to receive the ATTACH COMPLETE message, combined with the ACTIVATE DEFAULT EPS BEARER CONTEXT ACCEPT message, results in inconsistency between the EPS Session Management (ESM) sub-layer state in the UE and in the EPS. The inconsistency between the ESM sub-layer state in the UE and in the EPS may cause malfunction of the packet data session.

BRIEF SUMMARY OF THE INVENTION

Accordingly, embodiments of the invention provide apparatuses, systems, and methods for handling abnormal interrupts during an attach procedure in a mobile communication system. In one aspect of the invention, a service network handling abnormal interrupts during an attach procedure with a user equipment is provided. The service network comprises a radio access network and a control node. The radio access network is configured to receive an attach request message from the user equipment, send an attach accept message to the user equipment in response to the attach request message, and receive an abnormal interruption message after the attach accept message being sent, wherein the abnormal interruption message comprises any combination of a tracking area update request message from the user equipment and a first trigger event indicating that receiving an attach complete message from the user equipment has failed. The control node is configured to abort the attach procedure by sending a detach request message, via the radio access network, to the user equipment in response to the abnormal interruption message, and receive a detach accept message replied to the detach request message from the user equipment.

In another aspect of the invention, a method for a service network to handle abnormal interrupts during an attach procedure with a user equipment is provided. The method comprises receiving an attach request message from the user equipment, sending an attach accept message to the user equipment in response to the attach request message, receiving an abnormal interruption message after said sending the attach accept message, wherein the abnormal interruption message comprises any combination of a tracking area update request message from the user equipment and a first trigger event indicating that receiving an attach complete message from the user equipment has failed, aborting the attach procedure by sending a detach request message to the user equipment in response to the abnormal interruption message, and receiving a detach accept message replied to the detach request message from the user equipment.

In another aspect of the invention, a user equipment for handling abnormal interrupts during an attach procedure with a service network is provided. The user equipment comprises a wireless module and a controller. The wireless module is configured to send an attach request message to the service network, receive an attach accept message replied to the attach request message from the service network, receive a detach request message from the service network, wherein the detach request message is sent by the service network in response to an abnormal interruption message, and send a detach accept message to the service network in response to the detach request message. The controller is configured to determine whether a tracking area border is crossed, wherein if the tracking area border is not crossed, to send an attach complete message in response to the attach accept message; and wherein if the tracking area border is crossed, to send a tracking area update request message in response to the tracking area border being crossed.

In another aspect of the invention, a method for a user equipment to handle abnormal interrupts during an attach procedure with a service network is provided. The method comprises sending an attach request message to the service network, receiving an attach accept message replied to the attach request message from the service network, determining whether a tracking area border is crossed, wherein if the tracking area border is not crossed, sending an attach complete message in response to the attach accept message, and wherein if the tracking area border is crossed, sending a tracking area update request message in response to the tracking area border being crossed, receiving a detach request message from the service network, wherein the detach request message is sent by the service network in response to an abnormal interruption message, and sending a detach accept message to the service network in response to the detach request message.

In another aspect of the invention, a user equipment for handling tracking area changes during an attach procedure with a service network is provided. The user equipment comprises a wireless module and a controller. The wireless module is configured to send an attach request message to the service network and receives an attach accept message replied to the attach request message from the service network. The controller is configured to detect that a tracking area border is crossed and send a tracking area update request message, via the wireless module, to the service network in response to the tracking area border being crossed.

In another aspect of the invention, a method for a user equipment to handle tracking area changes during an attach procedure with a service network is provided. The method comprises sending an attach request message to the service network, receiving an attach accept message replied to the attach request message from the service network, detecting that a tracking area border is crossed, and sending a tracking area update request message to the service network in response to the tracking area border being crossed.

In another aspect of the invention, a service network, handling tracking area changes during an attach procedure with a user equipment is provided. The service network comprises a radio access network configured to receive the attach request message from the user equipment, send the attach accept message to the user equipment in response to the attach request message, and receive a tracking area update request message from the user equipment.

In another aspect of the invention, a method for a service network to handle tracking area changes during an attach procedure with a user equipment is provided. The method comprises receiving the attach request message from the user equipment, sending the attach accept message to the user equipment in response to the attach request message, and receiving a tracking area update request message from the user equipment.

In another aspect of the invention, a mobile communication system, handling abnormal interrupts during an attach procedure is provided. The mobile communication system comprises a user equipment and a service network. The user equipment is configured to send an attach request message to the service network, receive an attach accept message replied to the attach request message from the service network, determine whether a tracking area border is crossed, wherein if the tracking area border is not crossed, to send an attach complete message in response to the attach accept message, and wherein if the tracking area border is crossed, to send a tracking area update request message in response to the tracking area border being crossed, receive a detach request message from the service network, wherein the detach request message is sent by the service network in response to an abnormal interruption message, and send a detach accept message to the service network in response to the detach request message. The service network is configured to receive the attach request message from the user equipment, send the attach accept message to the user equipment in response to the attach request message, receive the abnormal interruption message after the attach accept message being sent, wherein the abnormal interruption message comprises any combination of the tracking area update request message from the user equipment and a first trigger event indicating that receiving the attach complete message from the user equipment has failed, abort the attach procedure by sending the detach request message to the user equipment in response to the abnormal interruption message, and receive the detach accept message replied to the detach request message from the user equipment.

In another aspect of the invention, a mobile communication system, handling tracking area changes during an attach procedure is provided. The mobile communication system comprises a user equipment and a service network. The user equipment is configured to send an attach request message to the service network, receive an attach accept message replied to the attach request message from the service network, detect that a tracking area border is crossed, and send a tracking area update request message to the service network in response to the tracking area border being crossed. The service network is configured to receive the attach request message from the user equipment, send the attach accept message to the user equipment in response to the attach request message, and receive the tracking area update request message from the user equipment.

Other aspects and features of the present invention will become apparent to those with ordinarily skill in the art upon review of the following descriptions of specific embodiments of a system, apparatuses, and methods for handling abnormal interrupts, including tracking area updates, lower layer failures, and guard timer expiries, during an attach procedure in a mobile communication system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. In order to give clear examples, the embodiments described below are utilized in E-UTRAN environments. In addition, 3GPP specifications are used to teach the spirit of the invention, and the invention is not limited thereto.

Figure 2:
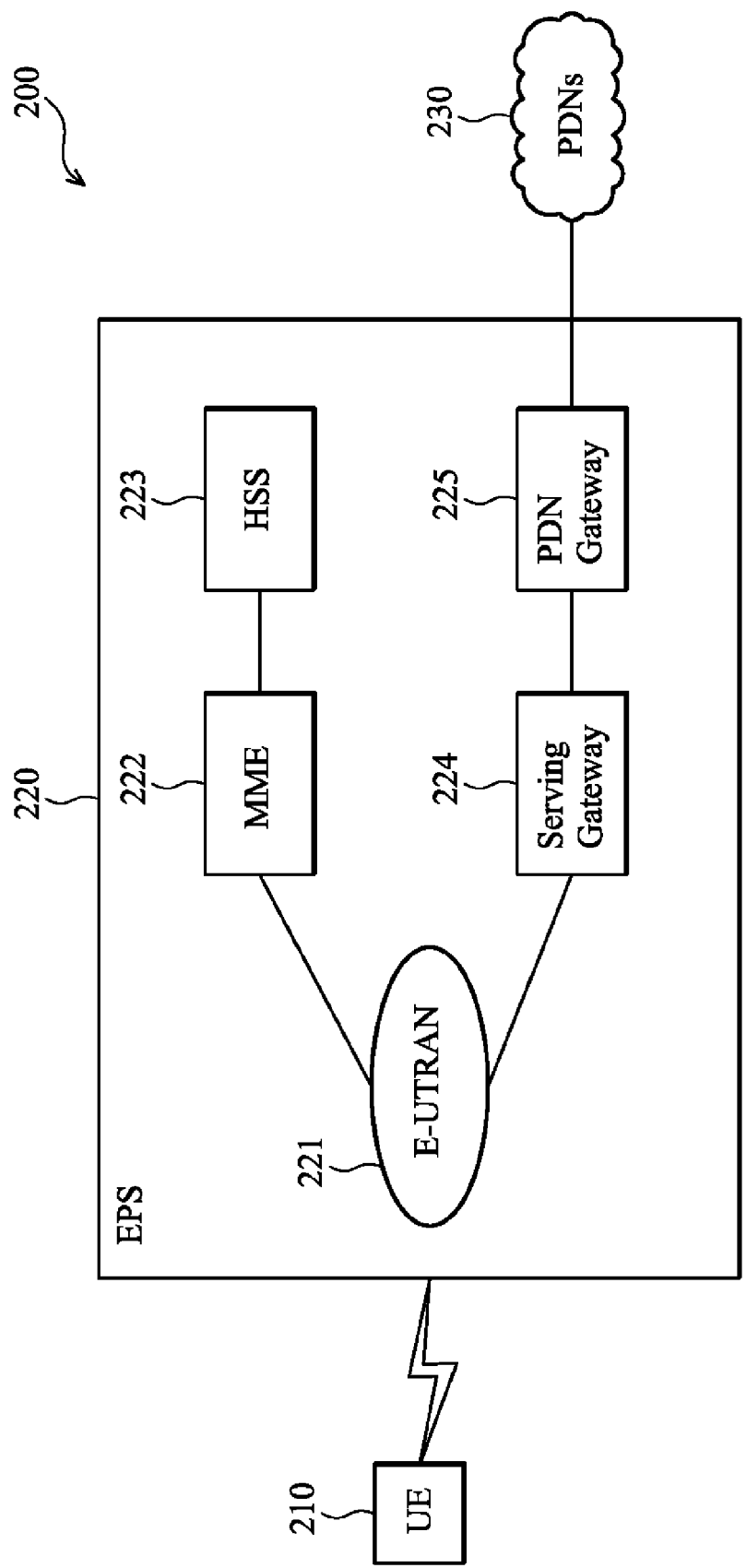
FIG. 2 is a schematic view of a mobile communication system according to an embodiment of the invention.

FIG. 2 is a schematic view of a mobile communication system according to an embodiment of the invention. The mobile communication system of FIG. 2 is shown using E-UTRA technology. While preferred implementation is described in E-UTRA context or application, the present invention may be employed in other mobile communication systems. In the mobile communication system 200, the UE 210 is connected to the Evolved Packet System (EPS) 220 via a radio access network (E-UTRAN) 221. The EPS 220 further comprises a control node (Mobility Management Entity, MME) 222, Home Subscriber Server (HSS) 223, Serving Gateway 224, and Packet Data Network (PDN) Gateway 225. The MME 222 is a control-plane entity, thus user-plane packets do not through the MME 222. The functions of the MME 222 are to manage the mobility of the UE 210 and perform the authentication and authorization procedures on the UE 210. The HSS 223 is a database for storing the subscription-related information for the authentication and authentication procedures. The serving Gateway 224 is a user-plane entity for forwarding and receiving the user IP packets to and from the E-UTRAN 221. The PDN Gateway 225 acts as an interface between the EPS 220 and the PDNs 230, such as the Internet. In practice, the MME 222 can be implemented in the Serving Gateway 224, and both the Serving Gateway 224 and the PDN Gateway 225 can be implemented as one physical network element.

Figure 3:
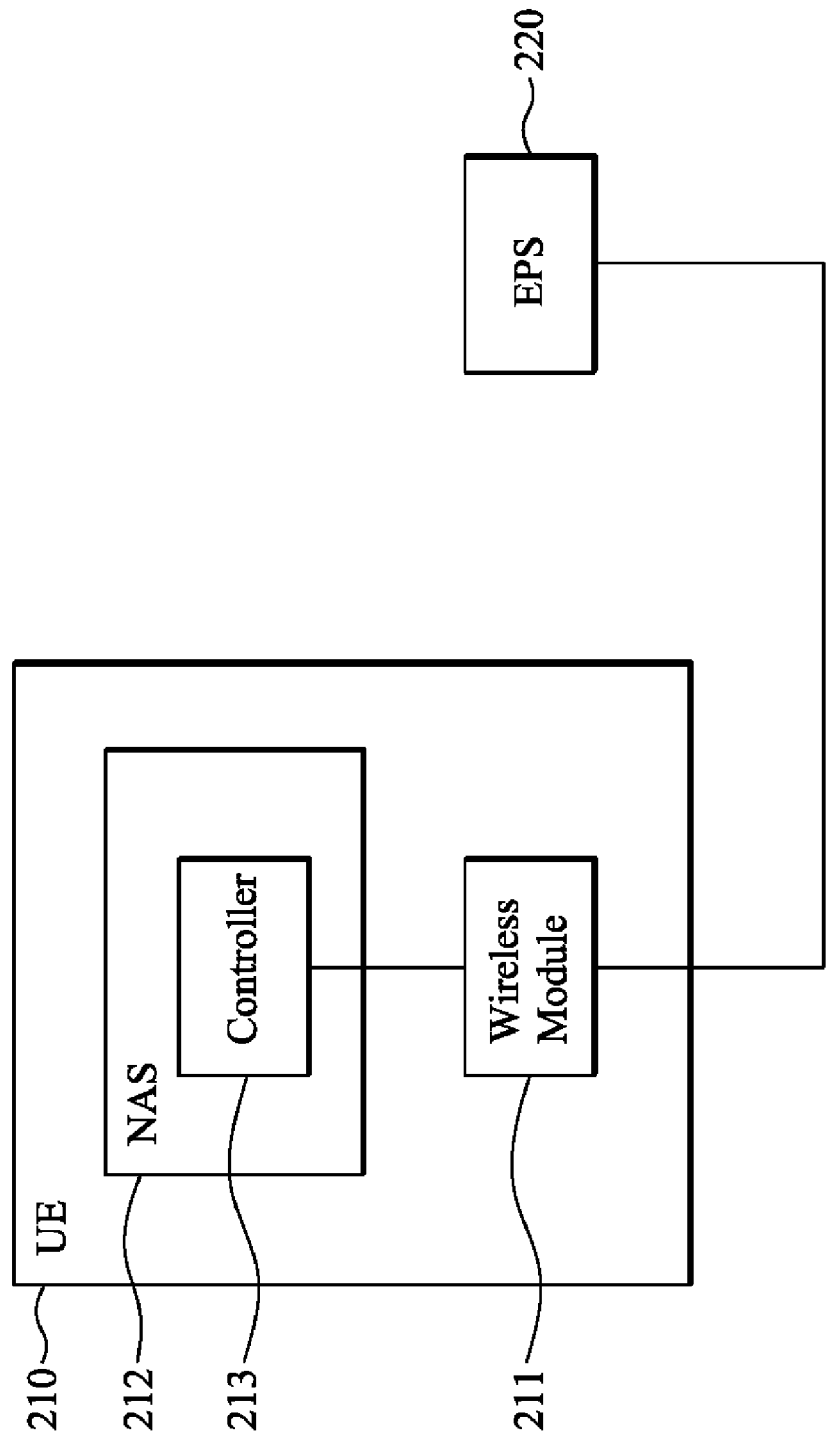
FIG. 3 is a block diagram illustrating in greater detail the UE shown in FIG. 2 according to an embodiment of the invention.

FIG. 3 is a block diagram illustrating in greater detail the UE shown in FIG. 2 according to an embodiment of the invention. The UE 210 has a wireless module 211 for receiving and transmitting messages propagated in radio frequency. The UE 210 also includes the NAS protocol stack 212 for receiving and transmitting messages from and to the EPS 220 via the wireless module 211. The connection between the NAS protocol stack 212 and the wireless module 211 may involve protocol stacks that are not shown in FIG. 3, such as the radio resource control (RRC) protocol stack, the radio link control (RLC) protocol stack, the medium access control (MAC) protocol stack, and the physical layer protocol stack. For practical implementations, any of the protocol stacks referred to in this specification may be realized by a combination of hardware and software. The NAS protocol stack 212 comprises a controller 213 for performing the NAS functions. Specially, the NAS functions related to handling the abnormal interrupts during an attach procedure. The operation of the controller 213 is explained in more detail in the following embodiments.

Figure 4:
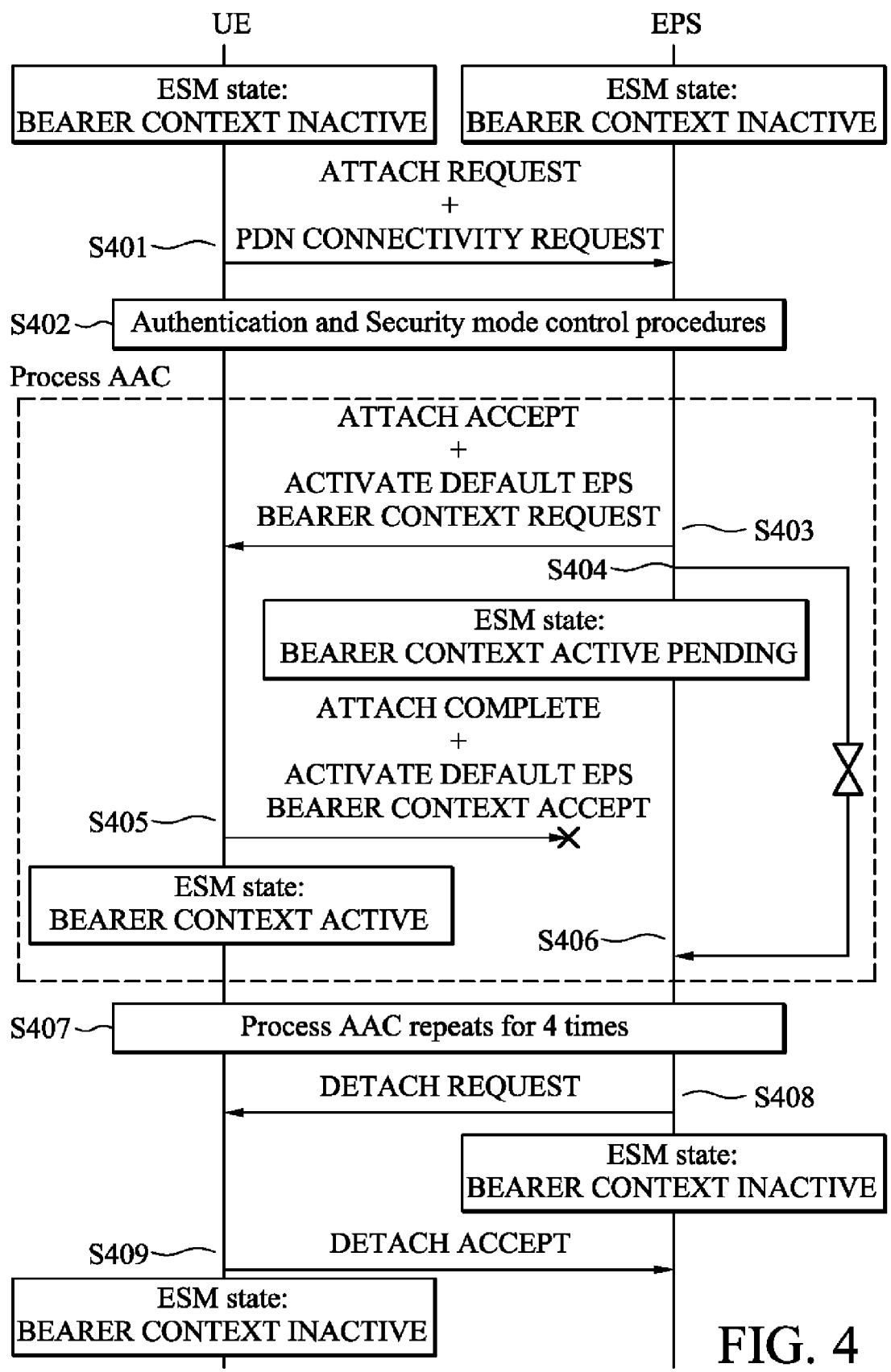
FIG. 4 is a message sequence chart illustrating the EPS handling an attach procedure being interrupted by a guard timer expiry according to an embodiment of the invention.

FIG. 4 is a message sequence chart illustrating the EPS handling an attach procedure being interrupted by a guard timer expiry according to an embodiment of the invention. Initially, both the ESM sub-layer of the UE 210 and the EPS 220 are in a BEARER CONTEXT INACTIVE state. When the UE 210 requests to register to the EPS 220 and start a packet data session with the EPS 220, the UE 210 sends an ATTACH REQUEST message, combined with a PDN CONNECTIVITY REQUEST message, to the EPS 220 (step S401). After reception of the ATTACH REQUEST message, the EPS 220 performs the authentication procedure, to check if the UE 210 is authorized, and the security mode control procedure to activate the encryption on the subsequent messages in the connection with the UE 210 (step S402). If the procedures end normally, the EPS 220 sends an ATTACH ACCEPT message, combined with an ACTIVATE DEFAULT EPS BEARER CONTEXT REQUEST message, to the UE 210 (step S403). Upon sending the ATTACH ACCEPT message, the EPS 220 starts a guard timer T3450 (step S404) and the ESM sub-layer of the EPS 220 enters a BEARER CONTEXT ACTIVE PENDING state. The UE 210 then responds with sending an ATTACH COMPLETE message, with an ACTIVATE DEFAULT EPS BEARER CONTEXT ACCEPT message combined, to the EPS 220 (step S405). Upon sending the ATTACH COMPLETE message, the ESM sub-layer of the UE 210 enters a BEARER CONTEXT ACTIVE state. However, the ATTACH COMPLETE message is not necessarily received by the EPS 220 due to some unexpected situation, and the guard timer T3450 expires (step S406). Subsequently, the process related to the ATTACH ACCEPT and ATTACH COMPLETE message, marked as Process AAC in FIG. 4, is repeated for 4 more times (step S407). Upon the fifth expiration of the guard timer T3450, unlike the conventional EPS which just stops repeating the process and leaves the ESM sub-layer state of the EPS 220 and the UE 210 inconsistent, the EPS 220 of the present invention aborts the attach procedure to synchronize the ESM sub-layer state in the EPS 220 and the UE 210. The EPS 220 sends a DETACH REQUEST message, with "re-attach required" indicated in the detach type information element (IE), to the UE 210 (step S408). Upon sending the DETACH REQUEST message, the ESM sub-layer of the EPS 220 enters the BEARER CONTEXT INACTIVE state. The UE 210 responds with sending a DETACH ACCEPT message to the EPS 220 to complete the detach procedure (step 409). Upon sending the DETACH ACCEPT message, the ESM sub-layer of the UE 210 also enters the BEARER CONTEXT INACTIVE state. Thus, the ESM sub-layer states in the EPS 220 and the UE 210 are consistent. Afterwards, the UE 210 can continue to restart the attach procedure as the previously received DETACH REQUEST message is with "re-attach required" indicated in the detach type IE.

Figure 5:
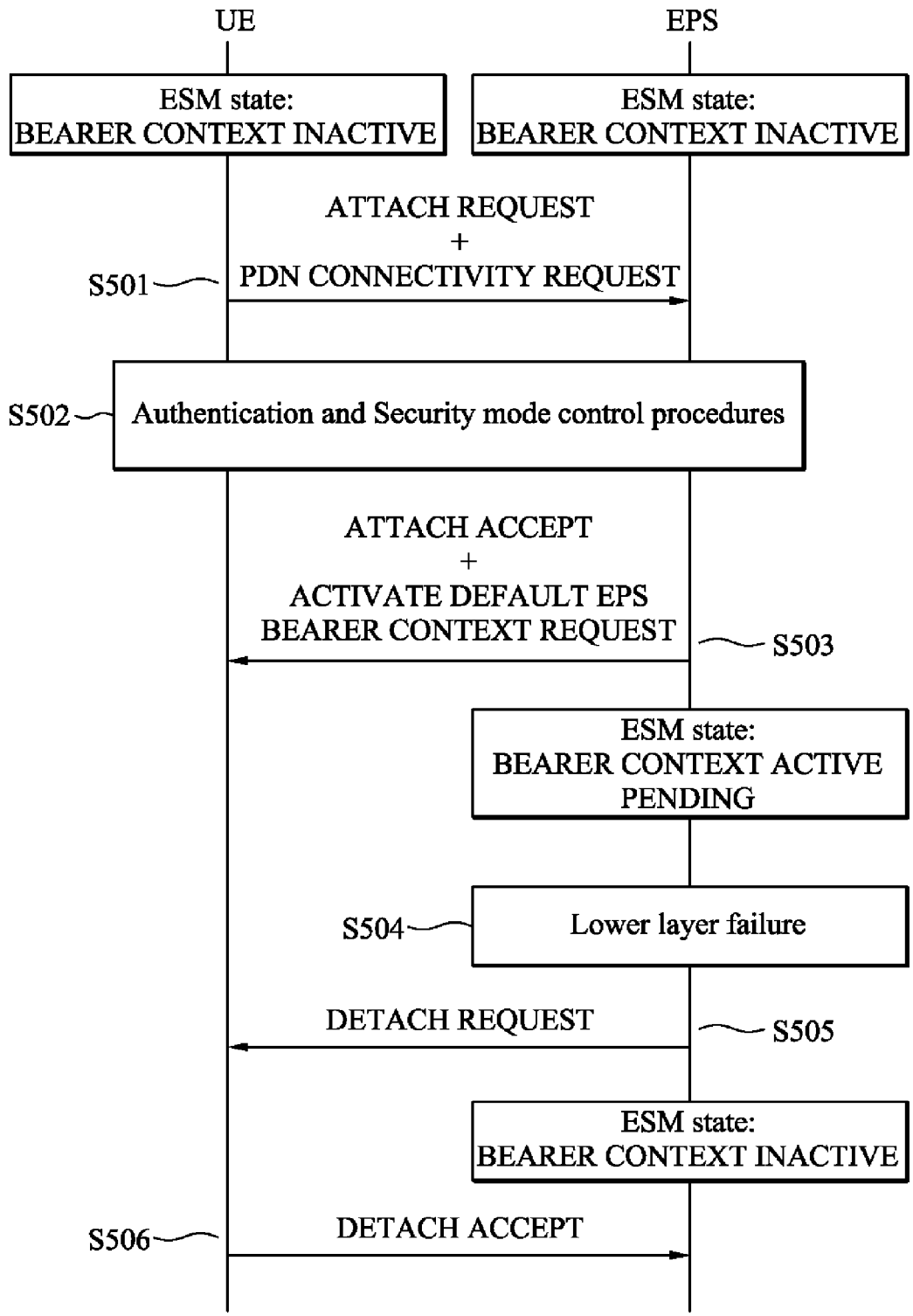
FIG. 5 is a message sequence chart illustrating the EPS handling an attach procedure being interrupted by a lower layer failure according to an embodiment of the invention.

FIG. 5 is a message sequence chart illustrating the EPS handling an attach procedure being interrupted by a lower layer failure according to an embodiment of the invention. Initially, both the ESM sub-layer of the UE 210 and the EPS 220 are in a BEARER CONTEXT INACTIVE state. When the UE 210 requests to register to the EPS 220 and start a packet data session with the EPS 220, the UE 210 sends an ATTACH REQUEST message, combined with a PDN CONNECTIVITY REQUEST message, to the EPS 220 (step S501). After reception of the ATTACH REQUEST message, the EPS 220 performs the authentication procedure, to check if the UE 210 is authorized, and the security mode control procedure to activate the encryption on the subsequent messages in the connection with the UE 210 (step S502). If the procedures end normally, the EPS 220 sends an ATTACH ACCEPT message, combined with an ACTIVATE DEFAULT EPS BEARER CONTEXT REQUEST message, to the UE 210 (step S503) and the ESM sub-layer of the EPS 220 enters a BEARER CONTEXT ACTIVE PENDING state. Just after the ATTACH ACCEPT message is sent, the radio access network (E-UTRAN 221) receives a trigger event indicating that the lower layer of E-UTRAN 221 has failed (step S504), which means that the EPS 220 may have missed the response message sent by the UE 210. This may result in inconsistency between the ESM sub-layer states in the EPS 220 and the UE 210. Unlike the conventional EPS which just stops the attach procedure and leaves the ESM sub-layer state of the EPS 220 and the UE 210 inconsistent, the EPS 220 of the present invention aborts the attach procedure to make sure the ESM sub-layer states in the EPS 220 and the UE 210 are consistent. The EPS 220 sends a DETACH REQUEST message, with "re-attach required" indicated in the detach type IE, to the UE 210 (step S505). Upon sending the DETACH REQUEST message, the ESM sub-layer of the EPS 220 enters the BEARER CONTEXT INACTIVE state. The UE 210 responds with sending a DETACH ACCEPT message to the EPS 220 to complete the detach procedure (step 506). The ESM sub-layer of the UE 210 remains in the BEARER CONTEXT INACTIVE state. Thus, the ESM sub-layer states in the EPS 220 and the UE 210 are consistent. Afterwards, the UE 210 can continue to restart the attach procedure as the previously received DETACH REQUEST message is with "re-attach required" indicated in the detach type IE.

Figure 6:
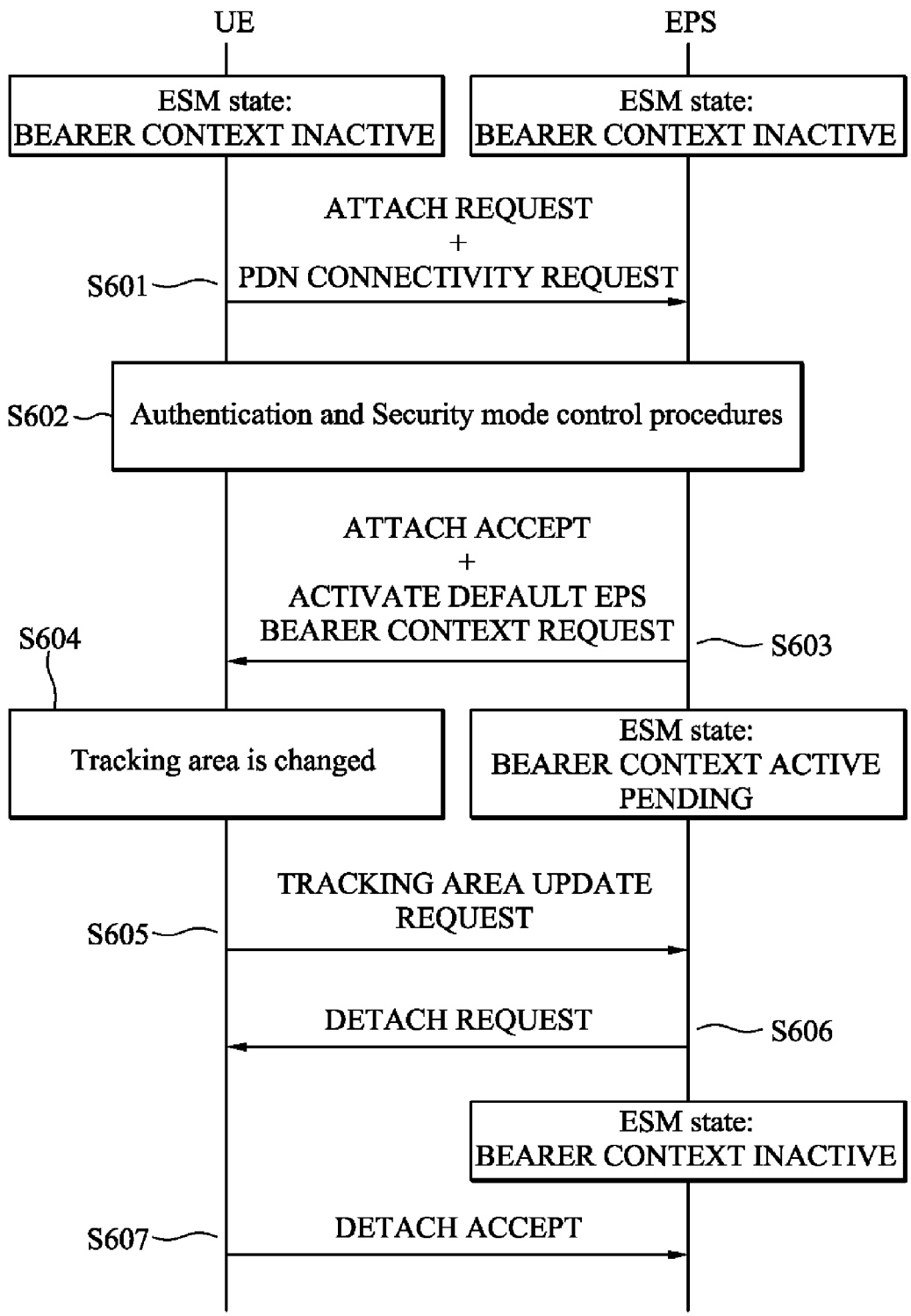
FIG. 6 is a message sequence chart illustrating the EPS handling an attach procedure being interrupted by a tracking area change according to an embodiment of the invention.

FIG. 6 is a message sequence chart illustrating the EPS handling an attach procedure being interrupted by a tracking area change according to an embodiment of the invention. Initially, both the ESM sub-layer of the UE 210 and the EPS 220 are in a BEARER CONTEXT INACTIVE state. When the UE 210 requests to register to the EPS 220 and start a packet data session with the EPS 220, the UE 210 sends an ATTACH REQUEST message, combined with a PDN CONNECTIVITY REQUEST message, to the EPS 220 (step S601). After reception of the ATTACH REQUEST message, the EPS 220 performs the authentication procedure, to check if the UE 210 is authorized, and the security mode control procedure to activate the encryption on the subsequent messages in the connection with the UE 210 (step S602). If the procedures end normally, the EPS 220 sends an ATTACH ACCEPT message, combined with an ACTIVATE DEFAULT EPS BEARER CONTEXT REQUEST message, to the UE 210 (step S603) and the ESM sub-layer of the EPS 220 enters a BEARER CONTEXT ACTIVE PENDING state. Before the UE 210 reacts on the received ATTACH ACCEPT message, it detects that the tracking area is changed due to a tracking area border being crossed (step S604) and sends a TRACKING AREA UPDATE REQUEST message to the EPS 220 (step S605). When the EPS 220 receives the TRACKING AREA UPDATE REQUEST message instead of an ATTACH COMPLETE message, it determines that the ESM sub-layer states in the EPS 220 and the UE 210 are not consistent. Thus, unlike the conventional EPS which just stops the attach procedure and leaves the ESM sub-layer state of the EPS 220 and the UE 210 inconsistent, the EPS 220 of the present invention aborts the attach procedure to make sure the ESM sub-layer states in the EPS 220 and the UE 210 are consistent. The EPS 220 sends a DETACH REQUEST message, with "re-attach required" indicated in the detach type IE, to the UE 210 (step S606). Upon sending the DETACH REQUEST message, the ESM sub-layer of the EPS 220 enters the BEARER CONTEXT INACTIVE state. The UE 210 responds with sending a DETACH ACCEPT message to the EPS 220 to complete the detach procedure (step 607). The ESM sub-layer of the UE 210 remains in the BEARER CONTEXT INACTIVE state. Thus, the ESM sub-layer states in the EPS 220 and the UE 210 are consistent.

Figure 7:
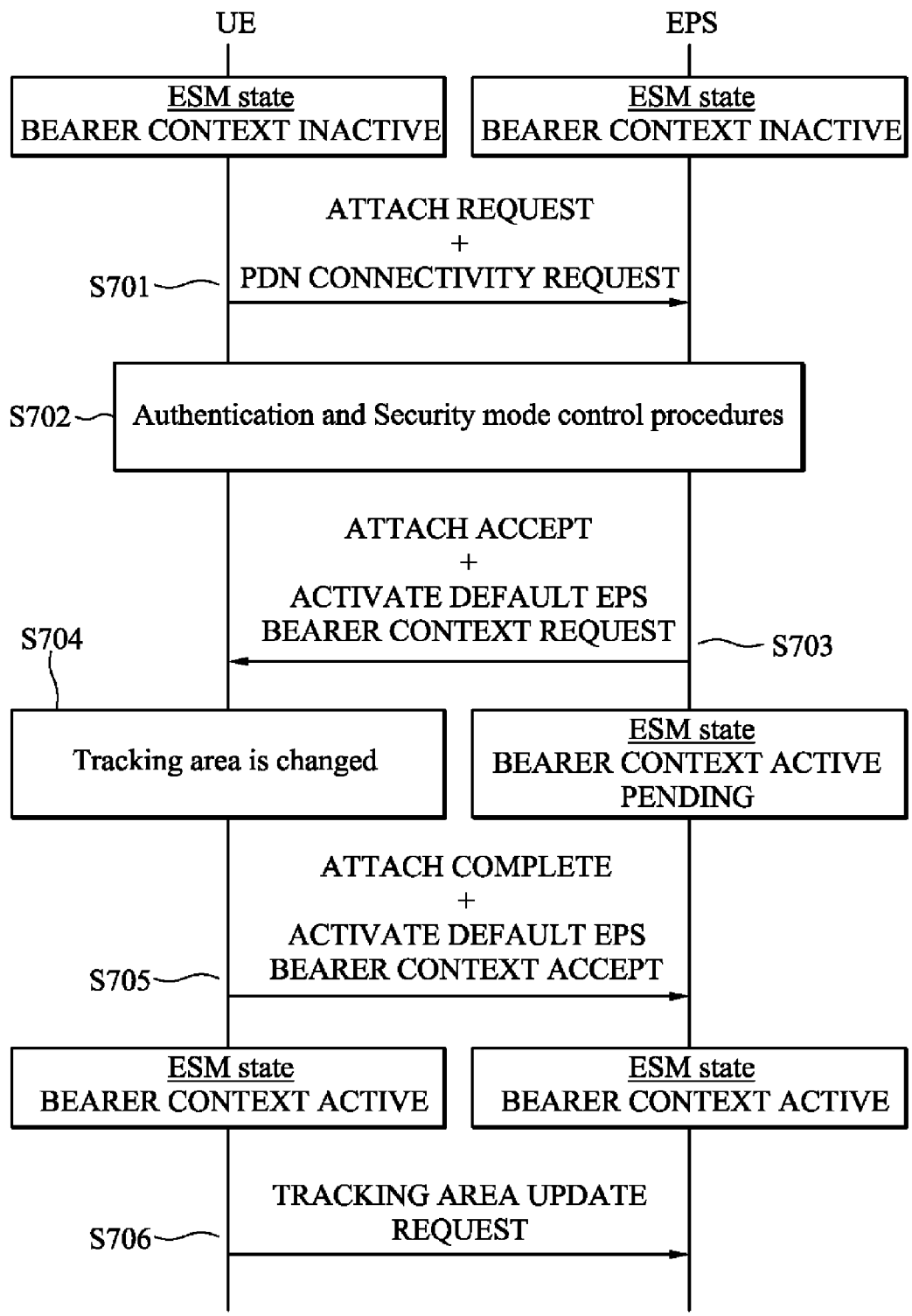
FIG. 7 is a message sequence chart illustrating the UE handling an attach procedure being interrupted by a tracking area change according to an embodiment of the invention.

In the described embodiments, the abnormal interrupts in an attach procedure are handled by the EPS 220. However, one of the abnormal interrupts—"a tracking area change occurred during an attach procedure", can also be handled by the UE 210 in the present invention. FIG. 7 is a message sequence chart illustrating the UE handling an attach procedure being interrupted by a tracking area change according to an embodiment of the invention. Initially, both the ESM sub-layer of the UE 210 and the EPS 220 are in a BEARER CONTEXT INACTIVE state. When the UE 210 is registered to the EPS 220 and starts a packet data session with the EPS 220, the UE 210 sends an ATTACH REQUEST message, combined with a PDN CONNECTIVITY REQUEST message, to the EPS 220 (step S701). After reception of the ATTACH REQUEST message, the EPS 220 performs the authentication procedure, to check if the UE 210 is authorized, and the security mode control procedure to activate the encryption on the subsequent messages in the connection with the UE 210 (step S702). If the procedures end normally, the EPS 220 sends an ATTACH ACCEPT message, combined with an ACTIVATE DEFAULT EPS BEARER CONTEXT REQUEST message, to the UE 210 (step S703) and the ESM sub-layer of the EPS 220 enters a BEARER CONTEXT ACTIVE PENDING state. Before the UE 210 reacts to the received ATTACH ACCEPT message, it detects that the tracking area is changed due to a tracking area border being crossed (step S704). Unlike the conventional UE which aborts the attach procedure and leaves the ESM sub-layer state of the EPS 220 and the UE 210 inconsistent, the UE 210 of the present invention continues the attach procedure to make sure the ESM sub-layer states in the EPS 220 and the UE 210 are consistent. In response to the received ATTACH ACCEPT message, the UE 210 sends an ATTACH COMPLETE message, combined with an ACTIVATE DEFAULT EPS BEARER CONTEXT ACCEPT message, to the EPS 220 (step S705) and the ESM sub-layer of the UE 210 enters a BEARER CONTEXT ACTIVE state. When the EPS 220 receives the ATTACH COMPLETE message, the ESM sub-layer of the EPS 220 also enters the BEARER CONTEXT ACTIVE state. Thus, the ESM sub-layer states in the EPS 220 and the UE 210 are consistent. In the case where other abnormal interrupts occur, the EPS 220 handles whatever situation that has occurred, according to the method illustrated in FIG. 4 and FIG. 5. Lastly, the UE 210 continues to initiate a tracking area update procedure by sending a TRACKING AREA UPDATE REQUEST message to the EPS 220 (step S706) upon sending the ATTACH COMPLETE message.

Figure 1:
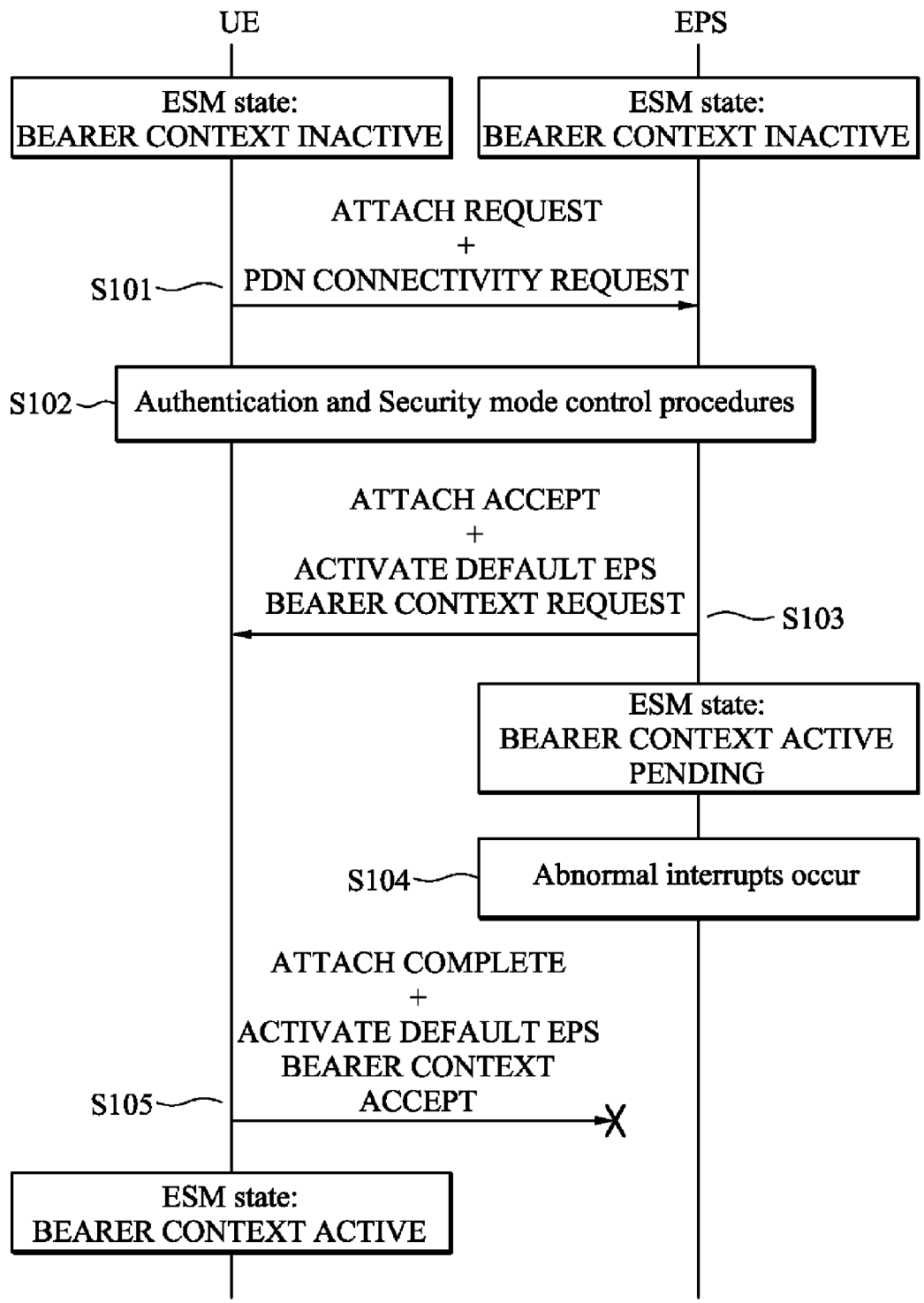
FIG. 1 is a message sequence chart illustrating an attach procedure being interrupted in a conventional mobile communication system.
Figure 8:
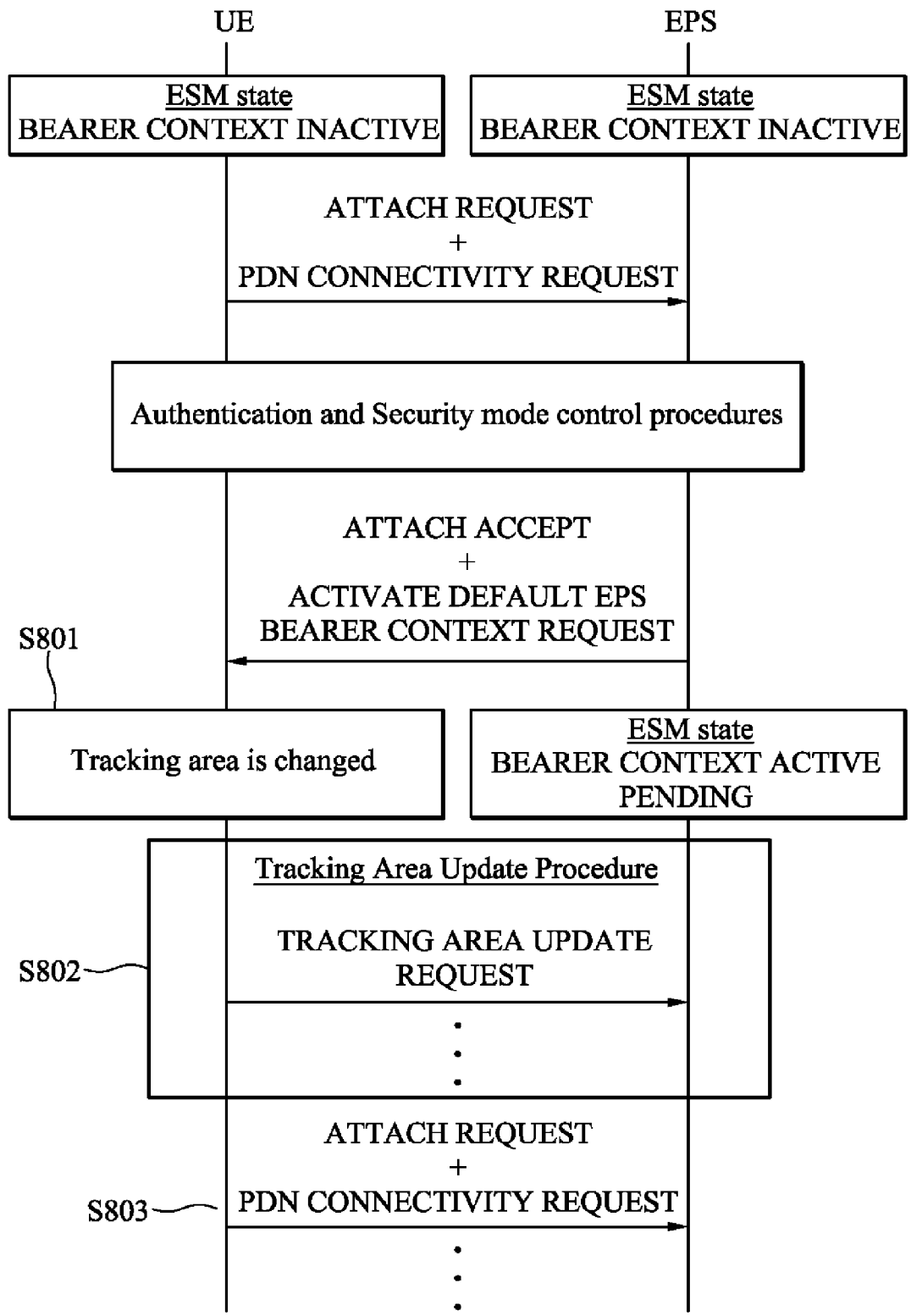
FIG. 8 is a message sequence chart illustrating the UE handling an attach procedure being interrupted by a tracking area change according to another embodiment of the invention.

In another scenario, the UE 210 may choose a different method to handle a tracking area change during an attach procedure. FIG. 8 is a message sequence chart illustrating the UE handling an attach procedure being interrupted by a tracking area change according to another embodiment of the invention. The steps before the UE 210 detects that the tracking area is changed are the same as step S701-S703. When the UE 210 detects that the tracking area is changed due to a tracking area border being crossed (step S801), the UE 210 initiates a tracking area update procedure by sending a TRACKING AREA UPDATE REQUEST message to the EPS 220 (step S802). Unlike the conventional UE which just aborts the attach procedure, initiates the tracking area update procedure, and leaves the ESM sub-layer state of the EPS 220 and the UE 210 inconsistent, the UE 210 of the present invention will restart the attach procedure after the tracking area update procedure is completed. Once the tracking area update procedure ends, the UE 210 restarts the attach procedure by sending the ATTACH REQUEST message, combined with the PDN CONNECTIVITY REQUEST message, to the EPS 220 (step S803). The rest of the attach procedure is the same as that illustrated in FIG. 1. Thus, the restarted attach procedure will assure that the ESM sub-layer states between the EPS 220 and the UE 210 are consistent.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment, handling tracking area changes during an attach procedure with a service network, comprising:
a wireless module configured to:
send an attach request message to the service network; and
receive an attach accept message replied to the attach request message from the service network; and
a controller configured to:
detect that a tracking area border is crossed;
send a tracking area update request message, via the wireless module, to the service network in response to the tracking area border being crossed; and
abort the attach procedure prior to the tracking area update request being sent in response to the tracking area border being crossed.

2. The user equipment of claim 1, wherein wireless module is further configured to send an attach complete message to the service network in response to the attach accept message, prior to the tracking area update request message being sent, if the tracking area border has not been crossed.

3. The user equipment of claim 1, wherein the controller is further configured to restart the attach procedure by sending another attach request message to the service network.

4. A method for a user equipment to handle tracking area changes during an attach procedure with a service network, comprising:
sending an attach request message to the service network;
receiving an attach accept message replied to the attach request message from the service network;
detecting that a tracking area border is crossed;
sending a tracking area update request message to the service network in response to the tracking area border being crossed; and
aborting the attach procedure prior to the tracking area update request message being sent in response to the tracking area border being crossed.

5. The method of claim 4, further comprising sending an attach complete message to the service network in response to the attach accept message, prior to said sending a tracking area update request message, if the tracking area border has not been crossed.

6. The method of claim 4, further comprising restarting the attach procedure by sending another attach request message to the service network.

7. A user equipment, handling abnormal interrupts during an attach procedure, comprising:
a wireless module configured to:
send an attach request message to a service network;
receive an attach accept message replied to the attach request message from the service network;
receive a detach request message from the service network, wherein the detach request message is sent by the service network in response to an abnormal interruption message; and
send a detach accept message to the service network in response to the detach request message; and
a controller configured to:
determine whether a tracking area border is crossed,
wherein if the tracking area border is not crossed, to send an attach complete message in response to the attach accept message;
wherein if the tracking area border is crossed, to send a tracking area update request message in response to the tracking area border being crossed; and
wherein the abnormal interruption message comprises the tracking area update from the user equipment.

8. The user equipment of claim 7, wherein the abnormal interruption message is received by the service network, and wherein the abnormal interruption message further comprises a first trigger event indicating that the service network fails to receive the attach complete message from the user equipment.

9. The user equipment of claim 8, wherein the first trigger event is generated when a guard timer for the attach procedure is expired for a predetermined number of times, and the guard timer is started when the service network sends the attach accept message and stopped when the service network receives the attach complete message.

10. The user equipment of claim 8, wherein the abnormal interruption message further comprises a second trigger event generated when a failure occurs in lower layers of a radio access network connecting the user equipment to the service network.

11. A method for a user equipment to handle abnormal interrupts during an attach procedure, comprising:

sending an attach request message to a service network;
receiving an attach accept message replied to the attach request message from the service network;
determining whether a tracking area border is crossed,
  wherein if the tracking area border is not crossed, sending an attach complete message in response to the attach accept message; and
  wherein if the tracking area border is crossed, sending a tracking area update request message in response to the tracking area border being crossed;
receiving a detach request message from the service network, wherein the detach request message is sent by the service network in response to an abnormal interruption message;
sending a detach accept message to the service network in response to the detach request message; and
wherein the abnormal interruption message is the tracking area update request message from the user equipment.

12. The method of claim 11, wherein the abnormal interruption message is received by the service network, and wherein the abnormal interruption message further comprises a first trigger event indicating that the service network fails to receive the attach complete message from the user equipment.

13. The method of claim 12, wherein the first trigger event is generated when a guard timer for the attach procedure is expired for a predetermined number of times, and the guard timer is started when the service network sends the attach accept message and stopped when the service network receives the attach complete message.

14. The method of claim 12, wherein the abnormal interruption message further comprises a second trigger event generated when a failure occurs in lower layers of a radio access network connecting the user equipment to the service network.

15. A service network, handling abnormal interrupts during an attach procedure with a user equipment, comprising:
  a radio access network configured to:
    receive an attach request message from the user equipment;
    send an attach accept message to the user equipment in response to the attach request message; and
    receive an abnormal interruption message after the attach accept message being sent, wherein the abnormal interruption message comprises a tracking area update request message from the user equipment; and
  a control node configured to:
    abort the attach procedure by sending a detach request message, via the radio access network, to the user equipment in response to the abnormal interruption message; and
    receive a detach accept message replied to the detach request message from the user equipment.

16. The service network of claim 15, wherein the tracking area update request message indicates that the user equipment has crossed a tracking area border.

17. The service network of claim 15, wherein the abnormal interruption message further comprises a first trigger event indicating that receiving an attach complete message from the user equipment has failed and wherein the first trigger event is generated when a guard timer for the attach procedure is expired for a predetermined number of times, and the guard timer is started upon sending the attach accept message and stopped when receiving the attach complete message.

18. The service network of claim 17, wherein the abnormal interruption message further comprises a second trigger event generated when a failure occurs in lower layers of the radio access network.

19. A method for a service network to handle abnormal interrupts during an attach procedure with a user equipment, comprising:
  receiving an attach request message from the user equipment;
  sending an attach accept message to the user equipment in response to the attach request message;
  receiving an abnormal interruption message after said sending the attach accept message, wherein the abnormal interruption message comprises a tracking area update request message from the user equipment; and
  aborting the attach procedure by sending a detach request message to the user equipment in response to the abnormal interruption message; and
  receiving a detach accept message replied to the detach request message from the user equipment.

20. The method of claim 19, wherein the tracking area update request message indicates that the user equipment has crossed a tracking area border.

21. The method of claim 19, wherein the abnormal interruption message further comprises a first trigger event indicating that receiving an attach complete message from the user equipment has failed and wherein the first trigger event is generated when a guard timer for the attach procedure is expired for a predetermined number of times, and the guard timer is started upon sending the attach accept message and stopped when receiving the attach complete message.

22. The method of claim 21, wherein the abnormal interruption message further comprises a second trigger event generated when a failure occurs in lower layers of a radio access network connecting the user equipment to the service network.

23. A mobile communication system, handling abnormal interrupts during an attach procedure, comprising:
  a user equipment configured to:
    send an attach request message to a service network;
    receive an attach accept message replied to the attach request message from the service network;
    determine whether a tracking area border is crossed,
      wherein if the tracking area border is not crossed, to send an attach complete message in response to the attach accept message; and
      wherein if the tracking area border is crossed, to send a tracking area update request message in response to the tracking area border being crossed;
    receive a detach request message from the service network, wherein the detach request message is sent by the service network in response to an abnormal interruption message; and
    send a detach accept message to the service network in response to the detach request message; and
  the service network configured to:
    receive the attach request message from the user equipment;
    send the attach accept message to the user equipment in response to the attach request message;
    receive the abnormal interruption message after the attach accept message being sent, wherein the abnormal interruption message comprises the tracking area update request message from the user equipment;
    abort the attach procedure by sending the detach request message to the user equipment in response to the abnormal interruption message; and receive the detach accept message replied to the detach request message from the user equipment.

24. The mobile communication system of claim 23, wherein the abnormal interruption message further comprises a first trigger event indicating receiving the attach complete message from the user equipment has failed and wherein the first trigger event is generated when a guard timer for the attach procedure is expired for a predetermined number of times, and the guard timer is started upon sending the attach accept message and stopped when receiving the attach complete message.

25. The service network of claim 24, wherein the abnormal interruption message further comprise a second trigger event generated when a failure occurs in lower layers of a radio access network connecting the user equipment to the service network.

26. A mobile communication system, handling tracking area changes during an attach procedure, comprising:
a user equipment configured to:
send an attach request message to a service network;
receive an attach accept message replied to the attach request message from the service network;
detect that a tracking area border is crossed;
send a tracking area update request message to the service network in response to the tracking area border being crossed; and
abort the attach procedure, prior to the tracking area update request being sent, in response to the tracking area border being crossed; and
the service network configured to:
receive the attach request message from the user equipment;
send the attach accept message to the user equipment in response to the attach request message; and
receive the tracking area update request message from the user equipment.

27. The mobile communication system of claim 26, wherein the user equipment is further configured to send an attach complete message to the service network in response to the attach accept message, prior to the tracking area update request message being sent.

28. The mobile communication system of claim 26, wherein the user equipment is further configured to restart the attach procedure by sending another attach request message to the service network.

* * * * *